(12) United States Patent
Lowry et al.

(10) Patent No.: US 6,571,043 B1
(45) Date of Patent: May 27, 2003

(54) LARGE SCREEN FIBER OPTIC DISPLAY WITH HIGH FIBER DENSITY AND METHOD FOR ITS RAPID ASSEMBLY

(75) Inventors: Brian C. Lowry, Emlenton, PA (US); Jerald F. Lowry, Pittsburgh, PA (US)

(73) Assignee: Transvision, Pittsburgh, PA (US)

( * ) Notice: Subject to any disclaimer, the term of this patent is extended or adjusted under 35 U.S.C. 154(b) by 183 days.

(21) Appl. No.: 09/718,745

(22) Filed: Nov. 22, 2000

Related U.S. Application Data (63) Continuation-in-part of application No. 09/482,290, filed on Jan. 13, 2000, now Pat. No. 6,304,703.

(51) Int. Cl.[7] ............................. G02B 6/04; G09F 13/18; G09G 3/00
(52) U.S. Cl. ........................ 385/120; 385/115; 385/116; 385/121; 385/147; 385/901; 385/1; 385/42; 40/546; 40/547; 345/40; 345/55; 359/451; 359/10; 359/11
(58) Field of Search .............................. 385/115, 116, 385/120, 121, 147, 901, 1, 2, 42; 40/546, 547; 345/32, 40, 55; 359/451, 10, 11

(56) References Cited

U.S. PATENT DOCUMENTS

| | | | | |
|---|---|---|---|---|
| 3,295,910 A | * | 1/1967 | Hourdiaux | 359/451 X |
| 3,644,922 A | * | 2/1972 | James et al. | 178/15 |
| 3,815,986 A | * | 6/1974 | Darbee | 340/815.42 |
| 4,116,739 A | * | 9/1978 | Glenn | 156/169 |
| 4,650,280 A | * | 3/1987 | Sedlmayr | 358/901.1 |
| 5,376,980 A | * | 12/1994 | Gersuk et al. | 353/94 |
| 5,381,502 A | * | 1/1995 | Veligdan | 348/742 |
| 5,400,178 A | * | 3/1995 | Yamada et al. | 359/443 |
| 5,832,168 A | * | 11/1998 | Yenter | 385/116 |
| 6,219,184 B1 | * | 4/2001 | Nagatani | 348/52 |
| 6,304,703 B1 | * | 10/2001 | Lowry | 345/32 |
| 6,396,985 B2 | * | 5/2002 | Lowry et al. | 385/120 |

* cited by examiner

Primary Examiner—Brian Healy
(74) Attorney, Agent, or Firm—James M. Singer; Pepper Hamilton LLP (57) ABSTRACT

This invention encompasses a method for the manufacture and rapid assembly of large screen fiber optic displays (1, 2) containing a very large number of individual fibers (thousands to hundreds of thousands, or more). The display surface is modularized into relatively small, thin, interchangeable, injection-molded square or rectangular tiles (3) to simplify manufacture and assembly. The hundreds of fibers (7) required for each tile (3) are machine-configured into a plurality of flat, flexible fiber optic ribbon cables (4), each cable (4) comprised of a planar geometric array of optical fibers (7) embedded in a thin adhesive matrix (8). The image emission end of each flat, flexible fiber optic cable (4) is a fiber manifold (20) joined to an injection-molded thermoplastic array of light guides (11), each fiber terminating in a single light guide or emitter (12). The fiber optic manifold (20) fits into a positioning slot molded into the light guide array (11), such that each optical fiber (7) in the manifold (20) is directed into a corresponding light guide (12). The support substrate for the manifold (20) is affixed to the light guide array (11) by "staking," that is, periodic, controlled, local deformation of the light guide array (11) to lock the manifold (20) into the positioning slot. The image reception ends of the plurality of cables (4) serving each display tile (3) are gathered into ordered arrays (5) to form an input matrix (13) for presentation of the display image. In one embodiment the flat, flexible fiber optic ribbon cables (4) which interconnect the input matrix (13) with the display tiles (3) join directly to the fiber manifolds (20) at the display (1, 2), while in a second embodiment the ribbon cables (4) are connected to the fiber manifolds (20) through fiber optic connectors (6), thus further simplifying assembly of the display (1, 2). The injection-molded light guide arrays (11) attach to the display tiles (3) in a simple and straightforward manner, for example, by a mechanical deformation ("snap-in") mechanism, fast-cure epoxy or other adhesive, or a combination of the two.

21 Claims, 5 Drawing Sheets

Fig 2b
Cable Section A-A

Fig 2c
Optional Cable Section A-A

LARGE SCREEN FIBER OPTIC DISPLAY WITH HIGH FIBER DENSITY AND METHOD FOR ITS RAPID ASSEMBLY

Continuation in part of application Ser. No. 09/482,290, filed Jan. 13, 2000, now U.S. Pat. No. 6,304,703.

PATENTS REFERENCED

U.S. Pat. No. 3,853,658
U.S. Pat. No. 4,773,730
U.S. Pat. No. 4,786,139
U.S. Pat. No. 4,839,635
U.S. Pat. No. 5,009,475
U.S. Pat. No. 5,376,201
U.S. Pat. No. 5,400,424
U.S. Pat. No. 5,911,024

BACKGROUND OF THE INVENTION

1. Field of the Invention

Large Screen Displays (LSD's) can be defined as any dynamic display which can be viewed by more than one person and is at least two feet wide. The LSD market is diverse, with many differing products and technologies, each having certain strengths and weaknesses, competing to fill the needs of the end user. Applications requiring outdoor use in direct sunlight have traditionally been served best by CRT (Cathode Ray Tube) or LED (Light Emitting Diode) displays, while indoor applications may be served by video walls or front/rear projection systems. The CRT/LED systems, while very bright (typically 4–6 kcd/$m^2$), are very expensive, and offer only marginally acceptable resolution. Moreover, they can only be viewed at a distance because of the need for the RGB (Red-Green-Blue) pixels to optically converge. Thus, they are not cost effective or suitable from resolution or minimum viewing distance criteria for indoor applications. Video walls are adequate for indoor use, but are bulky, not very bright (typically 250 cd/$m^2$), and suffer from the appearance of mullions between each of the displays comprising the wall. Data projectors offer high resolution, yet, because of the constraints of projection systems, are not suitable for many applications. (Typically such a projector must be located several meters or more from the projection surface.)

Fiber optic LSD's offer substantial improvements over current CRT- and LED-based displays, due to their smaller depth, lighter weight, and elimination of sensitive and expensive electronic components on the surface of the display, while delivering superior resolution and adequate brightness for direct sunlight viewing. Because no RGB convergence is required in fiber optic displays, the minimum viewing distance is considerably less than that of CRT/LED displays.

Fiber optic displays are superior to video walls because they lack mullions, are brighter, more rugged, and are much thinner. Fiber optic displays have an advantage over projection systems in that the display is a "stand-alone" unit which can be easily moved and installed at almost any location.

Clearly, fiber optic displays have compelling advantages over competing technologies. Fiber optic displays, however, are not without shortcomings. In fabricating large displays (e.g., >100 inches diagonal), the cost of optical fiber becomes considerable. Installing and managing the large amount of optical fiber required for a large display (as many as 120,000 individual fibers for a six by eight foot display) is tedious, time-consuming, and, therefore, costly, inasmuch as each fiber must be cut to length, polished for optimum light transmission, individually inserted into the display and positioned precisely with respect to the display surface, and cemented into place. The opposite ends of the fibers must be arranged in ordered arrays and affixed into position as an input matrix. All of these procedures must be performed without damage to the fiber or its somewhat fragile cladding, in order to assure good light transmission through the fiber. Furthermore, the long, ordered fiber bundles are difficult to manage and susceptible to damage. These problems become particularly severe when designing immersive LSD systems, such as an interactive gaming environment. The purpose of this invention is to address and overcome these and other shortcomings in state-of-the-art manufacturing and assembling of fiber-optic based large screen displays.

This application is a continuation in part of application Ser. No. 09/482,290

2. Description of Related Art

Methods currently used for the manufacture and assembly of large fiber optic display screens are both time-consuming and labor-intensive since each fiber must be installed individually in the display surface and then routed to the input matrix. Furthermore, each fiber must occupy an assigned location in the input matrix, corresponding to an assigned location in the display, in order that an image projected onto the input matrix will be faithfully reproduced on the display. The time and labor required to assemble such displays results in a cost per square foot (of display surface) which is so high as to be essentially non-competitive with other display technologies, thereby effectively eliminating fiber optic displays from this marketplace, even though such displays have many other advantages over competing technologies.

Numerous attempts have been made to develop large screen fiber optic displays which can be manufactured and assembled efficiently and are, therefore, cost-competitive with other display technologies. Although improvements have been made, none of these attempts have been very successful.

U.S. Pat. No. 4,839,635 discloses a fiber optic display system in which optical fibers transfer an image from an input matrix to a display matrix. The display system of this invention is constructed from a large number of small blocks, and purports to be a system which is easily manufactured. However, detailed examination of the patent indicates primarily manual assembly of the many parts. For example, the fibers are handled individually to form groups of eight. A group of eight fibers is manually wrapped with metal foil tape to form a close-packed element of the input matrix while the opposite end of the group is manually disposed into a set of foam blocks which must be cemented together to secure the fibers at the display matrix. It is the purpose of our invention to replace most of these manual operations with machine operations.

U.S. Pat. No. 5,911,024 discloses an apparatus and method of assembly for a fiber optic image enlarger that operates in cooperation with a CRT display. The assembly described involves the formation of individual fibers with male and female ends, making it time consuming, even with automation, to construct a display. The display apparatus described is also costly in terms of the volume of fiber used.

U.S. Pat. No. 5,400,424 discloses a fabrication method for a fiber optic display by joining hexagonal modules with conical projections, each conical projection fixing a discrete optical fiber. The intent of the conical projections is to scatter ambient light in order to enhance the appearance of the display. No mention is made of the problems of fiber management. Moreover, the patent discusses techniques to improve the wide-angle characteristics of the display by making V grooves on each fiber end. Clearly, any manufacturing process that involves handling individual fibers will not be inexpensive or simple to manufacture.

U.S. Pat. No. 3,853,658 discloses a fiber optic image magnifier panel and method for manufacture. In this patent the fibers are threaded through a metal aperture plate. As with the previous patent, concepts for simple and repetitive fiber management are not discussed.

In U.S. Pat. Nos. 4,773,730 and 4,786,139 Sedlmayr discloses an optical light transfer apparatus and method for manufacture. This method entails piecing together multiple wedge-shaped modular fiber display screen devices with the use of many fastening items to form a large screen display. This method involves a high part count and considerable manual assembly, both of which result in a high-cost product.

In U.S. Pat. No. 5,376,201 Kingston discloses a more elegant manufacturing method: an apparatus for forming fiber optic magnification devices. This method involves the simultaneous fabrication of both an input matrix and a display matrix on a large drum, but using a single spool of fiber, which is very time-consuming. Furthermore, a large display requires a significant separation between the input and display matrices, requiring fiber optic cables of eight to ten feet or more in length. Using Kingston's method would require a drum of six or more feet in diameter to fabricate such cables. The drum itself would be a very costly tool.

U.S. Pat. No. 5,009,475 discloses a molded component in which are formed a plurality of in situ waveguides, preferably tapered. These components can be designed and assembled to function as an image enlarger. Two methods of light propagation are described. First, the authors propose creating hollow light guides and then "backfilling" the guides with an optical plastic or glass which has a higher index of refraction than the surrounding mold material. In practice this is difficult to do because of the long optical paths. Over the length of these optical paths, it is difficult to prevent the formation of bubbles and inhomogeneities in the light transmitting medium, resulting in significant optical losses. The alternative is to use hollow light guides coated with a reflective material. This method as well is difficult to manufacture, and is characterized by large light transmission losses.

BRIEF SUMMARY OF THE INVENTION

This invention discloses a large screen fiber optic display with high fiber density and novel methods for simplifying and thereby cost-reducing the manufacture and assembly of large screen fiber optic displays containing very large numbers of individual fibers, by installing and managing the fibers in subgroups (of approximately 10–100) and groups (of approximately 100–1000) rather than individually.

DETAILED DESCRIPTION OF THE INVENTION

This invention comprises a method for the semi-automated manufacture and rapid, low-cost assembly of large screen fiber optic displays containing a very large number of individual fibers (thousands to hundreds of thousands, or more). Whereas the manufacture of state-of-the-art fiber-optic displays requires the manual installation of large numbers of individual, small optical fibers, this invention teaches automated and semi-automated methods for managing the fibers in subgroups of approximately ten to one hundred, and in groups or ordered arrays of approximately one hundred to one thousand, thus reducing the manufacturing and assembly labor by corresponding factors. The description of this invention, which follows, is facilitated by reference to the figures listed above.

The invention teaches a systematic method for the manufacture of large, ordered arrays of optical fibers by a) dividing the manufacturing process into several steps, some of which are fully automated and some of which are semi-automated for efficient, low cost mass production, and b) installing and managing the optical fiber in subgroups and groups rather than individually. The manufacturing steps are summarized below, and described in detail in subsequent paragraphs:

1. The automated manufacture of flat, multi-fiber ribbon cable (4) in continuous lengths;
2. The semi-automated (or automated) manufacture of flat, multi-fiber manifolds (20) to set the desired fiber pitch at the display surface and match this spacing to the fiber pitch of the ribbon cable (4);
3. The automated manufacture of molded arrays of light guides (12);
4. The manual or semi-automated insertion and locking of multi-fiber manifolds (20) into molded light guide arrays (11);
5. The automated manufacture of molded display tiles (3), perforated to accept arrays of light guides (11);
6. The automated manufacture of fiber optic interconnects (6) to join multi-fiber manifolds (20) to multi-fiber ribbon cable (4);
7. The automated attachment of fiber optic interconnects (6) to multi-fiber ribbon cable (4) and to multi-fiber manifolds (20);
8. The semi-automated formation of groups of flat optical fiber ribbon cables (4) into square (or rectangular) ordered fiber arrays (5);
9. The manual insertion of multi-fiber manifold (20) and light guide arrays (11) into molded display tiles (3);
10. The manual assembly of a plurality of identical display tiles (3) with light guide arrays (11) to form a display surface;
11. The manual engagement of fiber optic interconnects (6) which join multi-fiber ribbon cable (4) assemblies to multi-fiber manifold (20) and light guide arrays (11);
12. Formation of the input matrix (13);
13. Final assembly procedure.

Each of these manufacturing steps is discussed in detail below, with reference to FIGS. 1–5.

Figure 1:
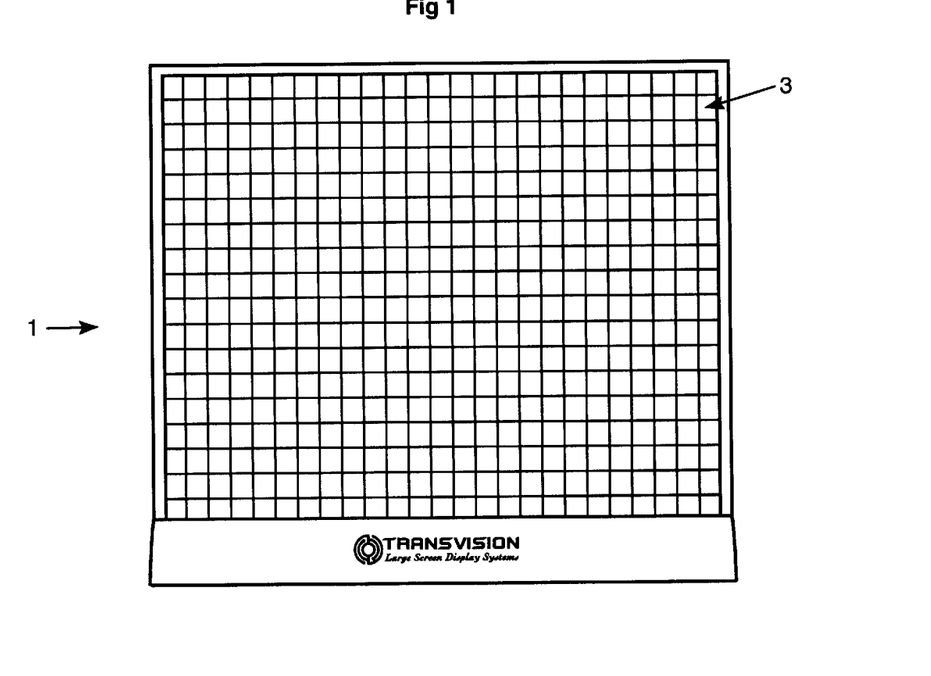
FIG. 1 is an illustration of two large screen displays (1, 2); a planar display (1) and a contoured display (2) with multiple curvatures.
Figure 2A:
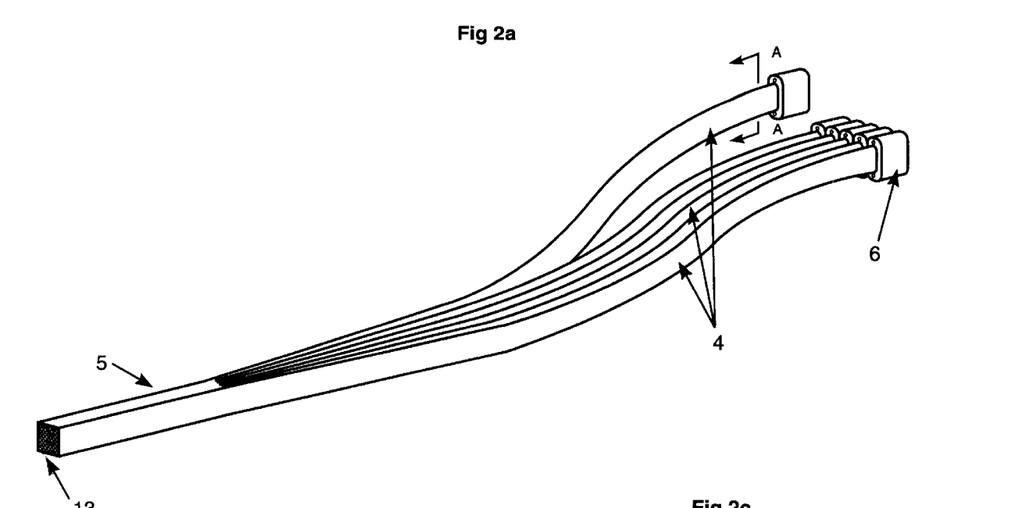
FIG. 2a is an illustration of a group of flat fiber optic ribbon cables (4) with fiber optic connectors (6) installed at one end for quick connection to a display tile (3), and formed into an ordered array (5) at the other end to form a portion of the input matrix (13); for simplicity, only a representative sample of the totality of cables (4) and connectors (6) is illustrated.
Figure 2B:
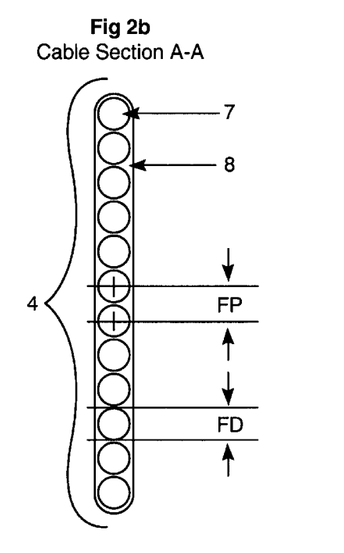
FIG. 2b is a cross-sectional view of a single ribbon cable (4) (subgroup of optical fibers) illustrating the fibers (7) embedded and secured in a planar (ribbon) configuration by the thin matrix adhesive (8).
Figure 2C:
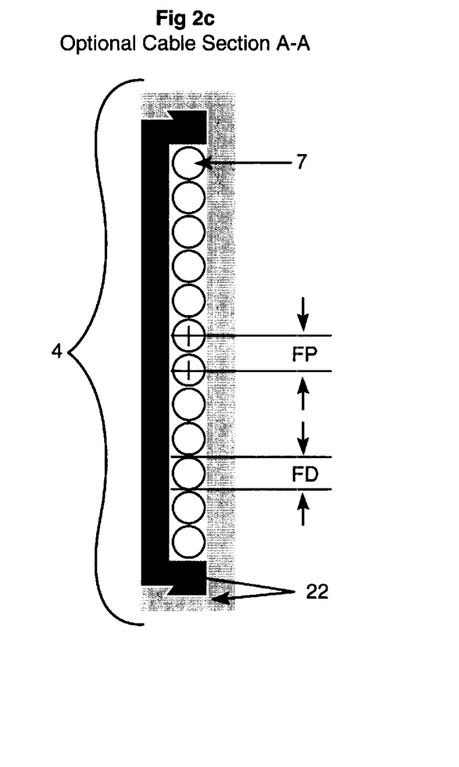
FIG. 2c is an alternative cross-sectional view of a single ribbon cable (4) (subgroup of optical fibers) illustrating the fibers (7) secured in a planar (ribbon) configuration by a two-part retention clip (22).

1. Automated Manufacture of Flat, Multi-Fiber Ribbon Cable in Continuous Lengths An optical fiber (7) subgroup consisting of a planar, multi-fiber ribbon cable (4) is manufactured in continuous lengths using an automated multi-head cabling machine. The cabling machine is equipped with feeder spools of plastic (or glass) optical fiber (7), the number of spools corresponding to the number of fibers in the ribbon cable, typically 10–100. The cabling machine is also equipped with a multi-head die, the number of heads also corresponding to the number of fibers (7) in the ribbon cable (4), to guide each fiber (7) into its correct position in the cable (4). The fibers (7) are pulled into the die and guided into position on an UV-curable matrix (8), a continuous ribbon-like adhesive system which bonds together the fibers (7) and maintains the desired ribbon configuration. As the fibers (7) are guided onto the ribbon matrix (8), the matrix is immediately cured by a UV (ultraviolet) curing system, thus forming a continuous planar fiber ribbon cable (4) in which the fibers are separated only by a small amount of matrix adhesive (typically less than 25 micro-meters), that is, the fiber pitch (FP) is less than 25 micro-meters greater than the fiber diameter (FD) (FP and FD are illustrated in FIG. 2c). The continuous length of optical fiber cable (4) which can be manufactured is determined by the amount of fiber (7) on the spools, typically 6–9 km or more. Alternatively, in lieu of an adhesive matrix, the cabling machine may be designed to retain the fibers (7) in a planar, ribbon configuration by installing two-part retention clips (22) disposed systematically along the cable (4) length. FIG. 2c is a cross-sectional illustration of a ribbon cable (4) formed using retention clips (22). The two mating parts of the clip (22) are designed to snap together and interlock to capture the fibers (7) in a planar configuration. Since there is no adhesive matrix to separate the fibers (7) in this alternative construction, the fiber pitch (FP) is equal to the fiber diameter (FD). FP and FD are illustrated in FIG. 2c.

2. The Semi-Automated (or Automated) Manufacture of Flat, Multi-Fiber Manifolds

The function of the multi-fiber manifolds (20) is to adjust the fiber pitch from the tight spacing of the input matrix (13) and fiber ribbon cable (4) to the wider pitch required for the light guides (11) on the surface of the display tiles (3). There are at least two manufacturing options for the manifold configuration, involving somewhat different technologies: a) a continuation of the fiber ribbon cable (4), with separation, spacing, and arrangement of the individual fibers (7) into the manifold (20) configuration; b) a separate entity fabricated by cutting and affixing individual fibers (7) to a thin thermoplastic substrate (10), the fibers (7) being arranged in the desired manifold (20) configuration which is then fitted on one end with a fiber optic connector (6) and mated to the fiber ribbon cable (4), said cable (4) being fitted with a mating fiber optic connector (6). Although there are decided differences in how these two options would be manufactured, in the end the primary difference is that option (b) requires a multi-fiber connector (6) to join the manifold to the cable (4), whereas option (a) does not require a connector (6). The primary advantage to option (a) is lower parts cost, since fiber optic connectors (6) are not required; the primary disadvantage to option (a) is that each display tile (3) has a length of fiber optic cable (4) attached to it, making it more awkward to handle during assembly, and thus increasing assembly costs. Using option (b) only the manifolds (20) are attached to the display tiles (3) initially, making them much easier to handle during assembly. (The fiber optic cables (4) are connected following the assembly of all the display tiles (3). However the disadvantage of option (b) is the connector (6) requirement, adding thus to the parts cost.

The manufacturing process for option (a) consists of the following steps:

1) Working with one fiber ribbon cable (4) length at a time, and separating out the individual fibers (7). This can be done during the cable manufacturing process by separating the fibers (7) from the UV-curable matrix (8) for a short region along the cable (4), and repeating this separation at pre-selected intervals.
2) The cable length with fibers (7) separated at one end is guided into a precision fixture which positions and spaces all the individual fibers (7) according to the manifold (20) configuration.
3) A thin thermoplastic substrate (10) with adhesive (UV-curable or other type) on one side is placed into the precision fiber (7) fixture, at a pre-determined location designed specifically for the substrate, with the adhesive and substrate in contact with the fibers (7) in the fixture.
4) The adhesive is cured and the fiber manifold (20) with cable (4) attached is removed from the fixture. The fiber manifold (20) is now a fiber array secured by a thin thermoplastic or polyimide sheet.
5) The fiber manifold (20) is mounted in a second fixture having a cutting edge which cleaves all fibers (7) simultaneously.

6) The fiber manifold (20) is now ready for insertion into a molded lightguide array (11).

The manufacturing process for option (b) consists of the following steps:

1) Individual fibers (7) are cut to approximate length from a fiber spool and placed in a precision fixture which positions and spaces all the individual fibers (7) according to the manifold (20) configuration.
2) A thin thermoplastic substrate (10) with adhesive (UV-curable or other type) on one side is placed into the precision fiber fixture, in a holder designed specifically for the substrate, with the adhesive in contact with the fibers (7) in the fixture.
3) The adhesive is cured and the fiber manifold (20) is removed from the fixture. The fiber manifold (20) is now a fiber array secured by a thin thermoplastic or polyimide sheet.
4) The fiber manifold (20) is mounted in a second fixture having a cutting edge which cleaves all fibers (7) simultaneously.
5) The input end of the manifold (20) is also secured and cleaved, and then fitted with a multi-fiber connector (6) designed to mate with a connector installed on one end of the flat fiber optic ribbon cable (4).

Alternatively, for option (b), multi-head numerically-controlled machines are available which can lay any optical fiber circuit or pattern on an adhesive-coated polyester, polyimide, or other type of substrate (10). Subsequently the adhesive is cured to fix the fiber configuration and affix the fibers (7) to the substrate (10).

3. Automated Manufacture of Molded Arrays of Light Guides

A molded light guide array (11) is comprised of a linear (strip), square, rectangular or other regular, spaced array of individual light guides (12), or emitters (12), each light guide (12) designed to accept and terminate a single optical fiber (7). Typically the design of an individual light guide (12), including the optical fiber (7) interface and the emitting (12) surface, which is typically a lens, is carried out by optical ray tracing using computer software, a design method which is well-known to those skilled in the art. The functions of the light guide array (11) are several:

1) Each individual light guide (12) serves as the termination point for a single optical fiber (7), and holds the fiber (7) end securely in the desired position, without undue mechanical stress to the fiber (7);
2) The light guides (12) allow light emitted from each optical fiber (7) to diverge (the divergence half-angle being the arcsine of the numerical aperture of the fiber) and grow in spot size to a pre-selected value;
3) The emitting surface of each light guide (12) is either a convex lens, a fresnel lens, or some other type of lens or diffusing optical element which spreads the diverging light cone from each optical fiber (7) into a wide-angle cone, thus enabling viewing of the display (1, 2) from a wide angle.
4) The emitting surfaces may be tailored to distribute the light into a wide angle in the horizontal plane, but not in the vertical plane, or vice versa, depending on viewing requirements, or they may be tailored to achieve any other desired spatial distribution of the light, either symmetrical or asymmetrical. An asymmetrical light distribution may be designed, for example, to direct the light in relation to the disposition of viewing areas in front of the display (1,2), thus maximizing the display brightness where viewers are most likely located.

Although the light guide array (11) may be molded into any desired two-dimensional shape, the preferred embodiments are either a single linear (strip) array, or a double strip (two parallel rows). The single or double strip array is most compatible with subgrouping the optical fibers (7) via flat fiber ribbon cable (4), and with the insertion of fiber manifolds (20) into the light guide arrays (11) to terminate subgroups of optical fibers at the display tiles (3).

The injection-molded light guide arrays (11) are designed to attach to the display tiles (3) in a simple and straightforward manner, for example, by a "snap-in" mechanism, a near-interference fit, fast-cure epoxy or other adhesive, or a combination of these or other methods.

4. The Manual or Semi-Automated Insertion and Locking of Multi-Fiber Manifolds into Molded Arrays of Light Guides The fiber optic manifolds (20) manufactured in Step 2 are inserted one-by-one into positioning slots molded into the linear light guide arrays (11), one manifold (20) into each light guide array (11) and, correspondingly, one fiber (7) terminating in each light guide (12), and "staked" into place using a periodic controlled mechanical deformation process which compresses the material of the light guide array (11) against the fiber manifold substrate (10), thus locking each fiber manifold (20) into its positioning slot and thereby securing both the entire array (11) and each individual fiber (7) in their respective positions. The staking process may be semi-automated using a staking machine. Alternatively the multi-fiber manifolds (20) may be secured using an adhesive or by a thermal fusion process. For small quantities this process may be performed manually, whereas for larger quantities it may be cost effective to employ a robotic assembler. The robotic assembler would be programmed to faithfully reproduce the steps required of a human assembler.

5. The Automated Manufacture of Molded Display Tiles

The display surface is modularized into relatively small, thin, interchangeable, molded or stamped, square, rectangular, or (in general) polygonal tiles (3) to simplify manufacture and assembly. Preferably the display tiles (3) are injection molded from unreinforced or fiber-reinforced thermoplastic material, such material chosen to be light absorbing (low reflectivity), flame retardant, impact resistant, UV resistant (unaffected by prolonged exposure to ultra-violet radiation), temperature stable, scratch resistant, and capable of meeting such additional environmental conditions as required by the final destination and location of the display (1, 2). Each tile (3) is molded with an ordered array of holes designed to accept the molded light guide arrays (11). In order to achieve contrast between the light image projected by the fibers (7) or light guides (12) and the background, which is the display surface, the surface of the tiles (3) must preferably be dark in color and nonreflective for visible light; thus the preferable surface finish and color is matte black. The manufacture of such tiles (3) by injection molding is well understood by those practiced in the art. The matte finished may be achieved, for example, by roughening the mold surface, e.g., by sandblasting.

Figure 3A:
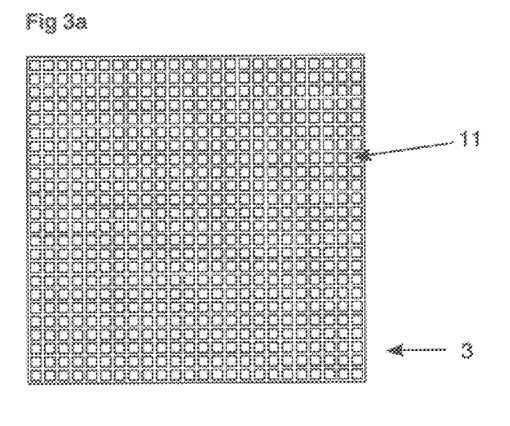
FIG. 3a is an illustration of an injection-molded display tile (3), with molded-in perforations to accept molded light guide arrays (11)
Figures 3B, 3D:
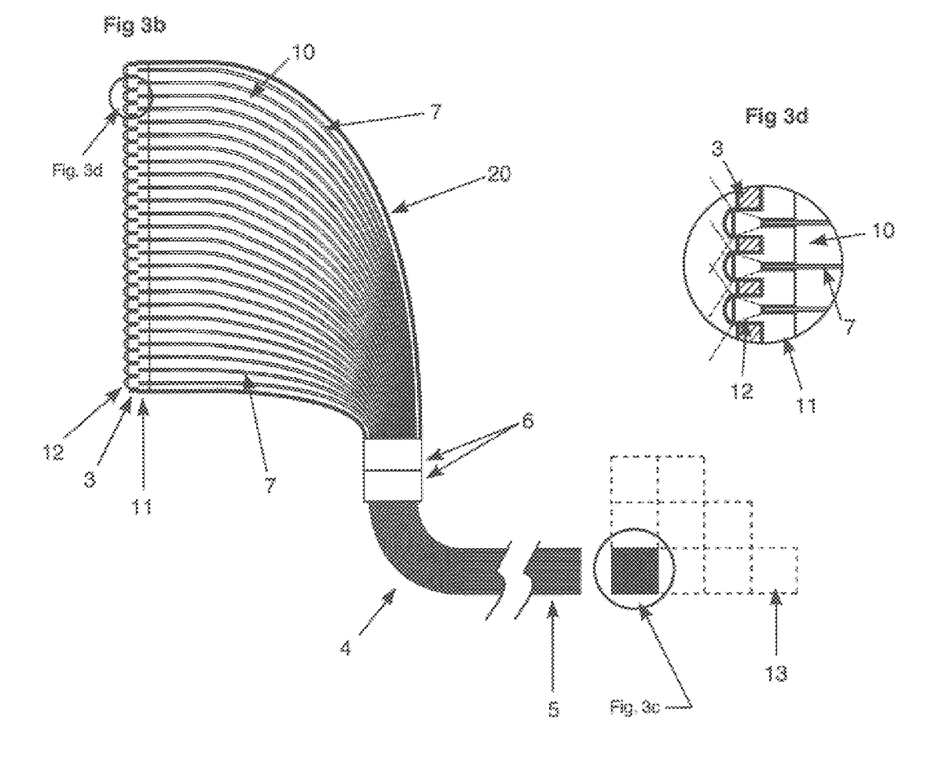
FIG. 3b is an illustration of the interconnection between the display tile (3) and the input matrix (13), comprised of a group of molded light guide arrays (11), a group of optical fiber manifolds (20) consisting of arrays of fibers (7) on thin substrates (10), fiber optic connectors (6) (mating pairs), and a group of fiber optic ribbon cables (4) terminating in an ordered array (5) which forms a part of the input matrix (13)
FIG. 3d is a cross-sectional view through a molded light guide array (11) and display tile (3), showing the relationship of the optical fibers (7) to the light emitters (12).
Figure 3C:
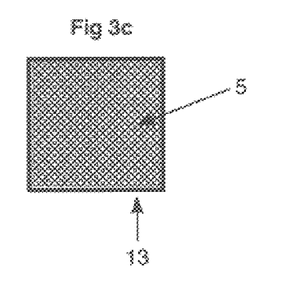
FIG. 3c is an end view of the ordered array (5) of optical fiber ribbon cables (4) formed into a portion of the input matrix (13)

6. The Automated Manufacture of Fiber Optic Interconnects to Join Multi-Fiber Manifolds to Multi-Fiber Ribbon Cable The automated manufacture of small connectors to join electrical wiring harnesses, or small fiber optic connectors (6) to join as many as 12 optical fibers (7), is state-of-the-art technology and is well known to those skilled in the art. This existing technology is adapted and extended to manufacture small fiber optic connectors (6) (mating pairs) for joining fiber optic ribbon cable (4) containing from 10–100 fibers to multi-fiber manifolds (20), as illustrated in FIGS. 2a and 3b.

7. The Automated Attachment of Fiber Optic Interconnects to Multi-Fiber Ribbon Cable and to Multi-Fiber Manifolds The automated attachment of small connectors to electrical wiring harnesses, or small fiber optic connectors (6) to six- or twelve-fiber planar optical fiber ribbon cable (4) is state-of-the-art technology and is well known to those skilled in the art. This existing technology is adapted and extended to attach small fiber optic connectors (6) to multi-fiber ribbon cables (4) comprised of 10–100 fibers. The mating connector is attached to one end of the multi-fiber manifold (20), as illustrated in FIG. 3b.

8. Semi-Automated Formation of Groups of Flat Optical Fiber Ribbon Cables into Square (or Rectangular) Ordered Fiber Arrays The multi-fiber ribbon cables (4) carry light from the input matrix (13) to the back of the display where they interface with fiber-optic manifolds (20) and light guide arrays (11) which communicate with the front of the display (1, 2). This is done most efficiently by pre-grouping the ribbon cables (4) according to the number of fibers (7) in one display tile (3) row. The multi-fiber ribbon cable (4) is measured out by machine, cut to a preselected length and stacked in a column, said column containing a number of ribbon cables (4) equal to the number of fibers (7) in each cable (4). For example, if the ribbon cable (4) is comprised of 24 individual fibers (7), then 24 cables (4) are stacked into an ordered square column. (It is also possible to make ordered rectangular arrays if required by a display tile (3) of rectangular shape.) One end of the stack of ribbon cables (4) is then manually inserted into a fixture which holds all the cables (4) securely in position while an inter-layer adhesive is applied to form this end (of the cable stack) into a monolithic square bundle. The result of this step is a square fiber optic cable (4) having one end arranged in an ordered array (5) with minimal spacing between rows and columns for a cable length of several inches, while the other end is comprised of "x" separate ribbon cables (4), where "x" is the number of fibers (7) in each ribbon cable (4), as illustrated in FIG. 2.

9. The Hand Insertion of Multi-Fiber Manifold and Light Guide Assemblies into Molded Display Tiles The linear light guide arrays (11), each having a multi-fiber manifold (20) attached, each manifold (20) either terminating in a multi-fiber interconnect (6) or continuing as a multi-fiber flat ribbon cable (4), are manually inserted into the molded display tiles (3). Each display tile (3) requires typically 15–30 or more light guide arrays (11). The attachment mechanism is one or a combination of several methods:

1) "Near-interference" fit, i.e. a very tight fit between the mating parts, requiring sufficient force to overcome friction as the two parts are mated;
2) "Snap-in" mechanism (selective interference so that a small amount of deformation is required to lock the parts together; can be reversible or non-reversible;
3) Fast-curing epoxy or other adhesive (the adhesive would be applied to the entire back surface of each display tile (3) as a thin coating, the light guide arrays (11) installed, and the adhesive cured.

Figure 4:
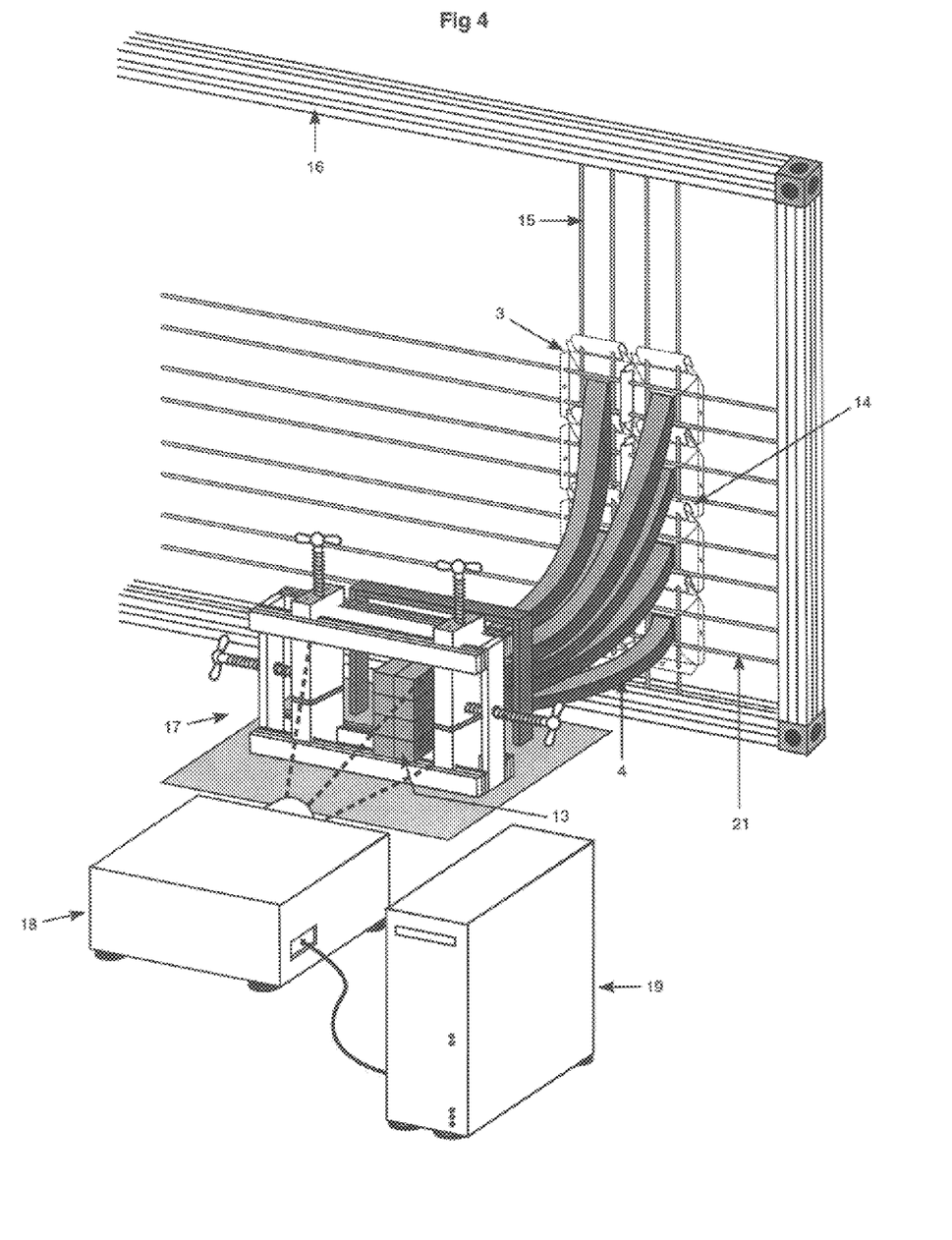
FIG. 4 is an illustration of the back of a large screen display (1, 2), showing how the individual display tiles (3) are positioned and secured to form the viewing surface of the display (1, 2), and showing schematically the relationship of the video projector (18) and control computer (19) to the input matrix (13). (In an actual display the input matrix (13), video projector (18), and control computer (19) are located in an enclosure in the base of the display (1, 2).

10. Manual Assembly of a Plurality of Identical Display Tiles with Light Guide Assemblies to Form a Display Surface The display support frame (16) is assembled, and the tile support and locator rod structure (15) is installed. The vertical rods (15) are placed in position first; to facilitate assembly these rods (15) are fabricated in sections a few feet in length, with new sections added as the rows of display tiles (3) are installed. The display tiles (3) are installed in horizontal rows along the vertical support and locator rods (15). Following the installation of several rows of tiles (3) and the clips (14) which attach the tiles (3) to each other, installation of the horizontal support and locator rods (21) begins. Additional vertical support rods (15) are added as the display (1, 2) is built up, and horizontal rods (21) are added after each row is completed. Thus the entire display (1, 2) is built up in horizontal rows until the final tile (3), and then the final horizontal supports rods (21), are added, thus completing the front display surface and securing all the tiles (3).

11. The Manual Engagement of Fiber Optic Interconnects Which Join Multi-Fiber Ribbon Cable Assemblies to Multi-Fiber Manifold And Light Guide Assemblies This step is only necessary if the flat fiber optic ribbon cable (4) has been fitted with connectors (6) in order to expedite display assembly (1, 2). In this case the multi-fiber ribbon cable assemblies (4) are joined to the corresponding multi-fiber manifold (20) and light guide arrays (11) on the back of each display tile (3) by manually engaging the fiber optic connectors (6). This is done along horizontal rows of display tiles (3), starting at the bottom of the display (2). As each tile (3) is connected the square group or ordered array of fiber optic cables (4) from that tile (3) is placed into the input matrix (13), and thus the input matrix (13) is formed as further described in Step 12.

12. Formation of Input Matrix

Figure 5A:
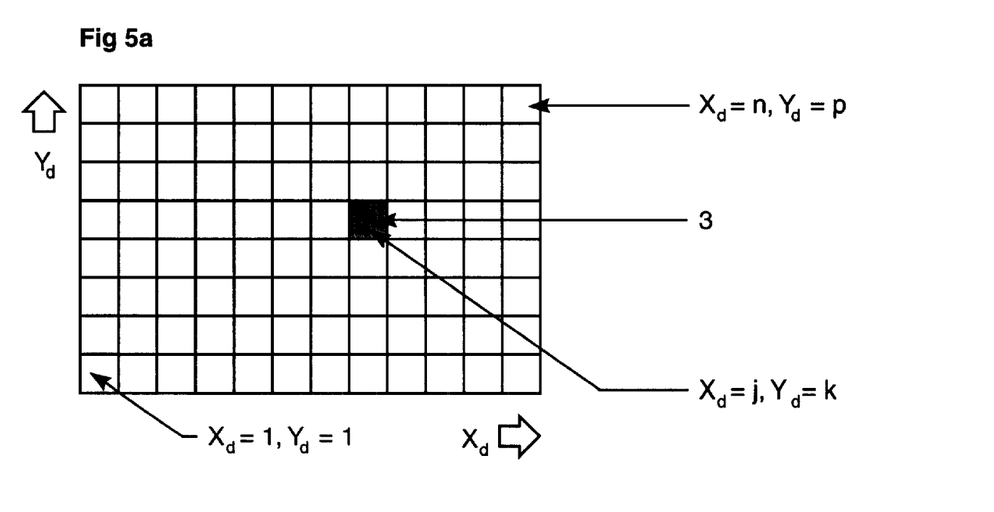
FIGS. 5a,b defines coordinate systems for the display surface (1, 2) (5a) (viewed from the front) and the input matrix (13) (5b) (viewed from the input side) and illustrates how a typical display tile (3) on the display surface, having coordinates $X_d$=j and $Y_d$=k, is mapped to a corresponding ordered array of fibers (7) comprising a portion of the input matrix (13), having coordinates $X_m$=n−j and $Y_m$=k, where n is the total number of tiles (3) comprising the width of the display surface (1, 2).
Figure 5B:
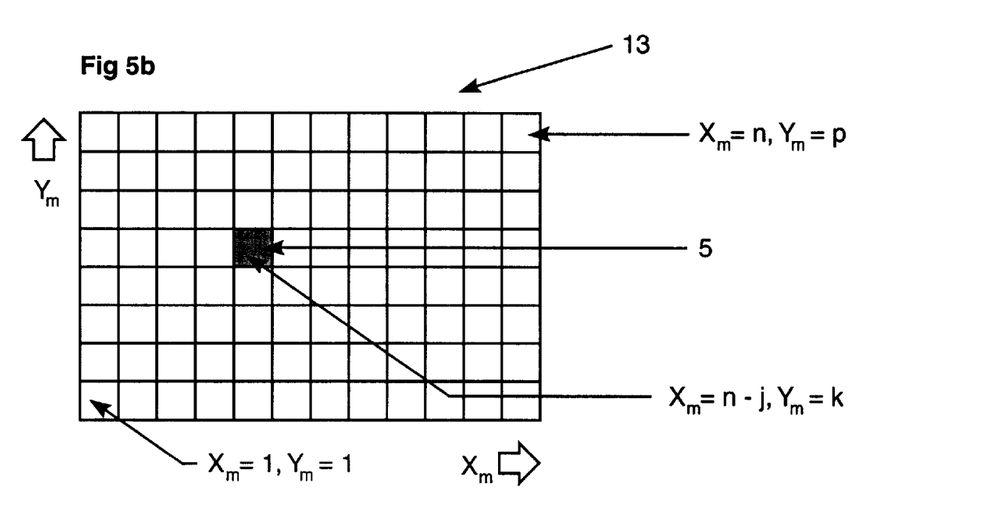

The square ordered arrays of planar fiber optic ribbon cables (4), one square array (5) from each display tile (3), are installed in the input matrix frame (17). The position of each fiber group or array (5) in the input matrix (13) is related to the position of the corresponding display tile (3) in the display matrix by a mapping function, as further illustrated in FIG. 5. If the optical fiber cables (4) have not been fitted with connectors, the input matrix (13) is assembled row by row as the display tiles (3) are mounted and located on the display (1, 2). If the optical fiber cables (4) have been fitted with connectors, the input matrix (13) is assembled row by row as the connectors (6) are engaged for each display tile, as discussed in Step 11. When all input fiber cables (4) have been installed the image plane is aligned and the frame (17) is tightened to secure all cables (4).

13. Final Assembly Procedure

The video projector (18) is installed, secured, focused, and aligned to the input matrix (13). The control computer (19) and interactive interfaces are then installed, as well as all required electrical connections. Finally, the blowers and other auxiliary components such as a UPS (uninterruptible power supply) and external covers are installed, thus completing the assembly of the large screen display (1, 2).

Although specific embodiments are disclosed herein, such embodiments are not intended to limit the scope of the following claims. It is also apparent that certain alterations may be made in the fabrications and manufacturing processes described, including the elimination of one or more processes, without departing from the scope of this invention.

We claim:
1. A fiber optic display comprising:
   a plurality of display tiles forming a display surface;
   at least one light guide array associated with each tile;
   a plurality of optical fibers formed into a plurality of groups of cables, each group having a first end and a second end;
   a multi-fiber manifold associated with each group of cables;
   a projection device; and a structural frame;

wherein the first end of each cable group forms a portion of an input matrix, and the second end of each cable group is connected to its associated manifold and is in communication with one of the light-guide arrays; and wherein the projection device is positioned to project images onto the input matrix.

2. The display of claim 1 in which the plurality of groups of cables may be formed into an ordered array or stack.

3. The display of claim 1 in which the fibers are terminated at or near the display tiles by a connector, said connector allowing a joining and alignment of optical fibers from the input matrix.

4. The display of claim 1 in which each light guide array is comprised of individual light guides or light emitters formed of single fibers.

5. The display of claim 4 in which the light guide array is comprised of individual light emitters, and the light emitters are positioned to asymmetrically distribute incoming light from the optical fibers.

6. The display of claim 1 in which the manifold affixes the optical fibers to the array and allows the optical fibers to be affixed to the array as a subgroup rather than as individual fibers.

7. The display of claim 1 in which display surface is larger than the input matrix, such that the images projected onto the input matrix are subsequently enlarged on the display surface.

8. The display of claim 1 in which the projection device is a data projector, a dynamic video image projector, or a static image projector.

9. The display of claim 1 further comprising a computing device which controls the projection device, said computing device providing content to the projector.

10. A fiber optic display comprising:

a plurality of display tiles forming a display surface;

at least one light guide array associated with each tile, each light guide array comprised of individual light guides or light emitters formed of single fibers;

a plurality of optical fibers formed into a plurality of groups of cables, each group having a first end and a second end, each group being capable of being formed into an ordered array or stack;

a multi-fiber manifold associated with each group of cables;

a projection device;

a computer for controlling said projection device; and a structural frame;

wherein the first end of each cable group forms a portion of an input matrix, and the second end of each cable group is connected to its associated manifold and is in communication with one of the light-guide arrays; and wherein the projection device is positioned to project images onto the input matrix.

11. A method for making a large screen fiber-optic display comprising the steps of:

grouping a plurality of optical fibers into a plurality of substantially flat, flexible ribbon cables having two ends;

forming said cables into an ordered array or stack, such that each stack comprises an input matrix at one end and an output matrix at the other end; and arranging each cable in a manifold to position the output matrix of the cable so that it is in communication with a light guide array.

12. The method of claim 11 in which the grouping step comprises:

feeding the fibers into a cabling machine having a plurality of heads to guide each fiber into a desired correct position in the cable;

bonding the fibers with an adhesive;

curing, using an ultraviolet light, the fibers and adhesive to form the cable.

13. The method of claim 12 in which the fibers have centers, and in which the desired position in the cable is such that the fiber centers are separated from each other by a space having a size not greater than the diameter of the fiber plus about 25 micrometers, which space may be at least partially filled by the adhesive.

14. The method of claim 12 in which the grouping step comprises:

feeding the fibers into a cabling machine having a plurality of heads to guide each fiber into a desired correct position in the cable; and securing the fibers to each other using one or more retention clips.

15. The method of claim 11 in which the forming step comprises measuring and cutting said cables to a preselected length, stacking said cables in a column, and securing said column into a substantially square bundle using an interlayer adhesive.

16. The method of claim 11 in which the arranging step comprises:

separating a portion of the fibers along a portion of the cable;

positioning the fibers into the manifold;

securing the portion of the fibers using an adhesive; and cleaving the fibers to form the output matrix.

17. The method of claim 16 in which the arranging step further comprises inserting the manifold into the light guide array.

18. The method of claim 17 in which the arranging step further comprises terminating the fibers in the light guide array using a deformation process which compresses the material of the light guide array against a substrate, thus securing the array and each individual fiber.

19. The method of claim 11 further comprising the step of attaching the light guide array to a display tile.

20. The method of claim 19 further comprising attaching the display tile to a support structure.

21. A method for making a large screen fiber optic display comprising the steps of:

grouping a plurality of optical fibers into a plurality of substantially flat, flexible ribbon cables having two ends;

forming said cables together into an ordered array or stack, such that each stack comprises an input matrix at one end and an output matrix at the other end; and arranging each cable in a manifold set to adjust a fiber pitch corresponding to said ribbon cables from the spacing of said input matrix to a wider pitch required for communication with a light guide array;

wherein said light guide array is comprised of a plurality of individual light guides, each of said light guides designed to hold an end of one of said optical fibers securely into a desired position with an emitting surface.

* * * * *